(12) United States Patent
Ogale

(10) Patent No.: US 9,438,795 B1
(45) Date of Patent: Sep. 6, 2016

(54) REAL TIME FEATURE EXTRACTION

(71) Applicant: Google Inc., Mountain View, CA (US)

(72) Inventor: Abhijit S. Ogale, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/753,947

(22) Filed: Jun. 29, 2015

Related U.S. Application Data

(63) Continuation of application No. 14/154,026, filed on Jan. 13, 2014, now Pat. No. 9,092,670, which is a continuation of application No. 13/488,325, filed on Jun. 4, 2012, now Pat. No. 8,666,159.

(51) Int. Cl.
*G06K 9/46* (2006.01)
*H04N 5/232* (2006.01)
*H04N 5/262* (2006.01)
*G06T 7/00* (2006.01)
*G06T 3/40* (2006.01)

(52) U.S. Cl.
CPC ......... *H04N 5/23238* (2013.01); *G06T 3/4038* (2013.01); *G06T 7/0085* (2013.01); *G06T 7/0097* (2013.01); *H04N 5/2624* (2013.01); *G06T 2207/10004* (2013.01); *G06T 2207/20164* (2013.01); *G06T 2207/20221* (2013.01)

(58) Field of Classification Search
USPC ....... 382/190, 305, 181, 115, 225, 149, 144, 382/154, 162, 166, 294; 250/208.1, 216, 250/559.44; 340/5.82; 345/36, 629; 348/218.1, E5.047; 356/3.01; 600/411, 600/424, 427, 436; 713/186
See application file for complete search history.

(56) References Cited

U.S. PATENT DOCUMENTS

| | | | |
|---|---|---|---|
| 6,242,731 B1* | 6/2001 | Bohn | G01B 11/024 250/208.1 |
| 6,975,434 B1 | 12/2005 | Pilu et al. | |
| 7,375,745 B2* | 5/2008 | Rai | H04N 5/23238 348/218.1 |
| 7,409,105 B2 | 8/2008 | Jin et al. | |
| 7,653,266 B2 | 1/2010 | Nakayama et al. | |
| 7,907,792 B2 | 3/2011 | Harville | |
| 8,395,634 B2 | 3/2013 | Ando et al. | |
| 8,417,058 B2 | 4/2013 | Tardif | |
| 8,532,402 B2* | 9/2013 | Medasani | G06T 7/0028 382/225 |
| 8,559,746 B2 | 10/2013 | Adams | |
| 8,644,588 B2* | 2/2014 | Preil | G03F 1/144 356/3.01 |
| 8,666,159 B1 | 3/2014 | Ogale | |
| 8,724,856 B1* | 5/2014 | King | G06K 9/00221 340/5.82 |

(Continued)

OTHER PUBLICATIONS

Texieira, et al., "Accelerated Corner-Detector Algorithms," 2008, <http://csce.uark.edu/.about.jgauch/library/papers/Teixeira.2008.pdf>.

(Continued)

*Primary Examiner* — Anh Do
(74) *Attorney, Agent, or Firm* — Lerner, David, Littenberg, Krumholz & Mentlik, LLP

(57) ABSTRACT

A computer-implemented method for method for detecting features in an image. The method includes receiving first and second images at one or more processors. The method also includes processing the first and second images to detect one or more features within the first and second images respectively. The method further includes generating a third image based on processed portions of the first and second images and outputting the third image to another processor. A mobile computing device and GPU are also provided.

20 Claims, 5 Drawing Sheets

(56) References Cited

U.S. PATENT DOCUMENTS

| | | | |
|---|---|---|---|
| 9,036,898 B1* | 5/2015 | Beeler | G06T 7/2033 382/154 |
| 2005/0207652 A1 | 9/2005 | Albertelli et al. | |
| 2009/0046098 A1 | 2/2009 | Barone et al. | |
| 2009/0122195 A1 | 5/2009 | van Baar et al. | |
| 2010/0232727 A1 | 9/2010 | Engedal | |

OTHER PUBLICATIONS

Anh, et al., "Image Processing on the GPU," Feb. 27, 2005, <http://www.cis.upenn.edu/.about.suvenkat/700/projects/alt.pdf>.
Phull, et al., "Low Complexity Corner Detector Using CUDA for Multimedia Applications," MMEDIA 2011.

* cited by examiner

| X | X | 0 | X | X |
|---|---|---|---|---|
| X | 1 | T | 2 | X |
| 3 | L | 4 | R | 5 |
| X | 6 | B | 7 | X |
| X | X | 8 | X | X |

FIG. 1

REAL TIME FEATURE EXTRACTION

CROSS-REFERENCE TO RELATED APPLICATIONS

The present application is a continuation of U.S. patent application Ser. No. 14/154,026, filed Jan. 13, 2014, now U.S. Pat. No. 9,092,670, which is a continuation of U.S. patent application Ser. No. 13/488,325, filed on Jun. 4, 2012 and issued as U.S. Pat. No. 8,666,159, the entire disclosures of which are hereby incorporated by reference.

BACKGROUND

The subject application relates to the detection of features in image data. More specifically, the subject invention relates to the detection and indication of corner features in one or more images.

With the increasing sophistication of mobile technology, the integration of digital cameras into mobile computing devices (such as smart phones), has become quite common. Due to the inherently small nature of such devices, video stabilization is often difficult. Furthermore, smaller camera devices are typically limited in view angle, thus, in order to produce a panorama image, multiple separate images must first be aligned and then "stitched" together. One way to improve video stabilization and/or alignment amongst multiple images, is to identify and correlate image features across multiple frames. Although feature detection may theoretically be performed using any common feature amongst frames, edges and corners can be detected using known processing algorithms.

SUMMARY

The disclosed subject matter relates to a computer-implemented method for detecting features in an image, comprising, receiving a first image, at a graphics processing unit (GPU), wherein the GPU comprises a plurality of memory units and wherein the first image is stored in a first memory unit of the plurality of memory units and processing a second image stored in a second memory unit of the plurality of memory units, to detect one or more features within the second image. In certain aspects, the method further comprises steps for writing one or more processed portions of the second image to a third memory unit of the plurality of memory units and outputting a third image stored in a fourth memory unit of the plurality of memory units.

The disclosed subject matter also relates to a mobile computing device for detecting features in an image, comprising, one or more processors, comprising a graphics processing unit (GPU) and a computer-readable medium comprising instructions stored therein, which when executed by the processors, cause the processors to perform operations comprising: receiving a first image at the GPU, wherein the GPU comprises a plurality of memory units and wherein the first image is stored in a first memory unit of the plurality of memory units and processing a second image stored in a second memory unit of the plurality of memory units, to detect one or more features within the second image. In certain implementations, the processors can be further configured to perform steps for writing one or more processed portions of the second image to a third memory unit of the plurality of memory units and outputting a third image stored in a fourth memory unit of the plurality of memory units.

The disclosed subject matter also relates to a graphics processing unit (GPU) comprising a plurality of memory units, wherein the GPU is configured to perform operations comprising, receiving a first image from a CPU, wherein the first image is stored in a first memory unit of the plurality of memory units, processing a second image stored in a second memory unit of the plurality of memory units, to detect one or more features within the second image and writing one or more processed portions of the second image to a third memory unit of the plurality of memory units. In certain aspects, the GPU is further configured to perform operations for outputting a third image stored in a fourth memory unit of the plurality of memory units, wherein processing the second image and outputting the third image are performed simultaneously.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology.

Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 1 illustrates an example of pixels from a source image that can be sampled for detection of one or more features, according to some aspects of the subject disclosure.

DETAILED DESCRIPTION

Figure 2:
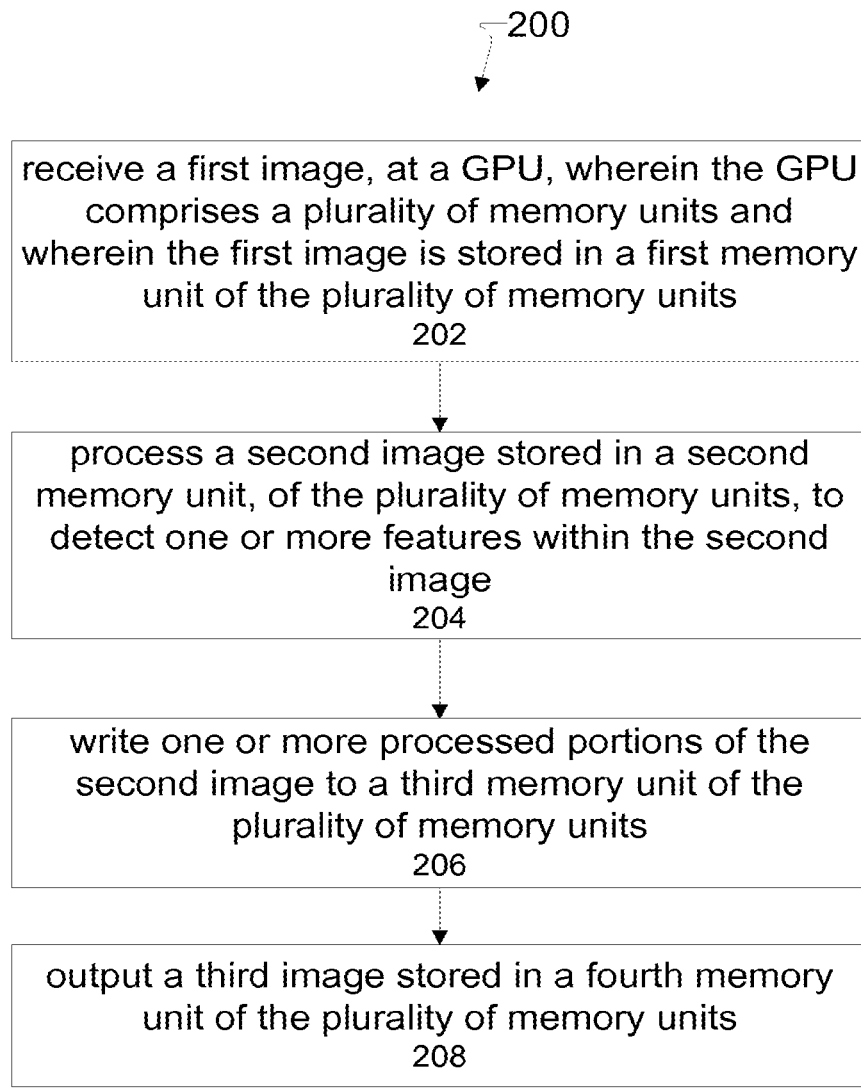
FIG. 2 illustrates a flow diagram of an example method for detecting features in an image, according to some aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The instant disclosure provides a system and method for detecting image features and descriptors in real-time. More specifically, the subject disclosure provides a means by which features (e.g., corners) can be detected amongst one or more image frames. Detection can be performed on any computing device; however, in some implementations detection will be performed on a mobile computing device, such as a smart phone, digital camera, or tablet PC, etc. Processing necessary to detect one or more features can be performed using one or more processing devices (e.g., one or more GPUs and/or CPUs, etc.). In some implementations, a known corner detection algorithm (e.g., a Harris corner detector) can be implemented.

Feature detection can include the detection of corners in image content and can be performed using one or more memory devices, CPUs and/or GPUs, etc. In some implementations, the corner detection may be performed using the hardware (e.g., GPUs and/or CPUs) of a mobile device, such as, a smart phone. The GPUs and/or CPUs of the mobile device may comprise multiple memory portions. For example, the GPU may comprise one or more on-chip memory portions including one or more "textures" and/or one or more "frame buffers." Each of the on-chip memory portions may be logically divided into one or more discrete textures (e.g., for reading image data into the GPU) and/or one or more discrete frame buffers (e.g., for storing processed image data outputted from the GPU). By configuring the GPU to assist in performing corner detection processing, overall system performance can be enhanced, for example, by enabling, the CPU to be free to perform other tasks.

In certain aspects, the GPU memory can be partitioned into logically separate memory units for use in facilitating the performance of different image processing tasks. For example, an on-chip memory of the GPU may be partitioned into one or more logically separate "textures" (e.g., for use in receiving unprocessed image data from a CPU). Similarly, the on-chip memory may be further partitioned into one or more logically separate "frame buffers" (e.g., for use in sending processed image data back to the CPU). More specifically, using the two textures, the GPU can begin to perform processing on image data stored in the first texture, while additional image data (e.g., data of a new image) is concurrently written into the second texture (e.g., by the CPU). The ability to write an additional image to the second texture of the GPU enables the CPU to continue sending unprocessed image data to the GPU, without the need to wait for the GPU to complete the concurrent processing task before receiving additional unprocessed image data.

After corner detection is complete for image data stored within a particular texture, the processed image data is stored in a frame buffer. For example, after corner detection is performed for an image corresponding with the first texture, the resulting image can be stored into the first frame buffer. Subsequently, after corner detection for the image of the second texture is complete, the result may be stored to the second frame buffer.

Image data stored in the frame buffers (e.g., processed images indicating the locations of corners in a particular image frame) can be used to perform additional tasks with respect to associated source images (e.g., aligning multiple frames to produce a panorama and/or used to facilitate video stabilization, etc.). Furthermore, in some implementations, the use of multiple frame buffers (e.g., two frame buffers) will increase the throughput of the corner detection system by enabling a fully processed image stored in one frame buffer (e.g., a second frame buffer) to be outputted, while a different image is being processed and written into another frame buffer (e.g., a first frame buffer). By utilizing multiple textures on the input side of the GPU (as well as having multiple frame buffers on the output side), processing labor can be more effectively distributed between the CPU and the GPU, enabling CPU resources to be used for other processing tasks as feature detection is performed.

Although aspects of the subject technology can involve the implementation of any corner detection algorithm, in certain implementations a Harris detection algorithm may be implemented using one or more GPUs and/or CPUs, etc. In one implementation, nine texture values may be sampled from source image data (e.g., a source image) and used to compute an image gradient (Ix, Iy) for each of four pixel locations surrounding a common center pixel.

Figure 1:
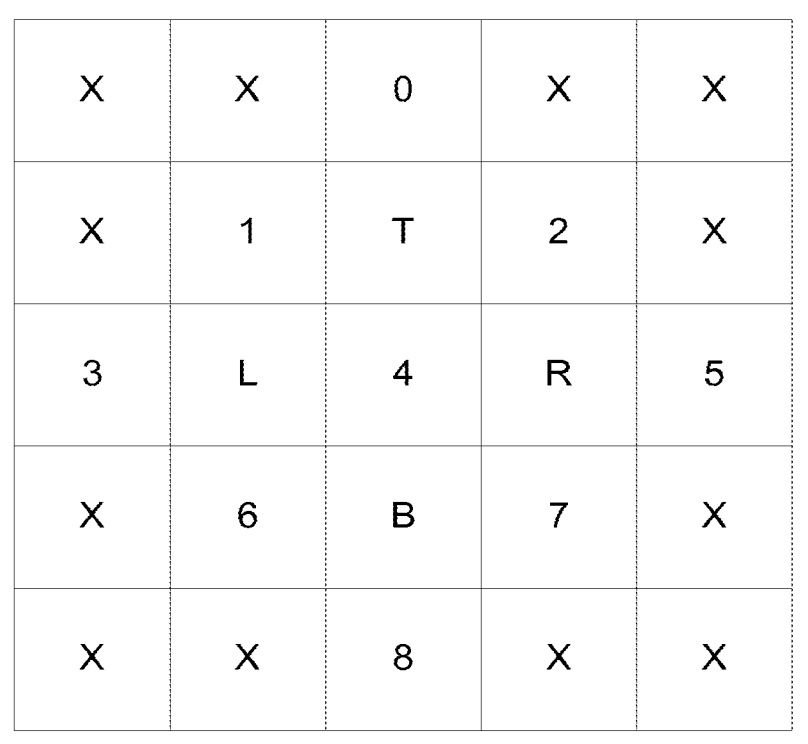

FIG. 1 illustrates an example of pixels from a source image that can be sampled for detection of one or more features, according to some aspects of the subject disclosure. Specifically, FIG. 1 illustrates an example of 25 image pixels that can be used to perform Harris detection. In FIG. 1, a total of 9 pixels are sampled (e.g., pixel boxes 0-8). Subsequently, the image gradient for each of the four pixel location (e.g., pixel boxes labeled L, T, R and B) can be used to compute a 2×2 matrix of corner strength. In some implementations, the matrix A is given from the following equation:

$$A(x) = \sum_{x,y} w(x, y) \begin{bmatrix} I_x^2 & I_x I_y \\ I_x I_y & I_y^2 \end{bmatrix} \qquad (1)$$

Using the determinant (d) and trace (t) of matrix A, the corner strength (R) of the Harris corner detector can be determined by:

$$R = \det(A) - \alpha \operatorname{trace}^2(A) \qquad (2)$$

Where alpha is a specified parameter. Although alpha can be any chosen constant, in certain implementations alpha can be set in the range of 0.02 to 0.06.

After the corner strength is determined, non-maximum suppression can be performed to eliminate duplicate corners in the processed image in order to determine the final corner locations. Furthermore, in some implementations the original gray value of the center pixel is written into one of the color channels and used to extract a normalized descriptor (e.g., using a CPU) after the corner locations have been finalized. The gradient value may also be compactly encoded into one of the remaining color channels to form part of the descriptor. A descriptor is useful for subsequent processing stages which match corners between multiple images. Corners from different images with similar descriptors are likely to correspond to the same object. Applications such as video stabilization or panorama stitching all rely on matching corners across multiple images using their descriptors.

FIG. 2 illustrates a flow diagram of an example method 200 for detecting features in an image, according to some aspects of the subject disclosure. The method 200 begins with step 202 in which a first image is received at a GPU, wherein the GPU comprises a plurality of memory units and wherein the first image is stored in a first memory unit of the plurality of memory units.

Although the GPU memory can be divided up into any number of logical units, in some implementations the GPU memory will comprise two textures (e.g., a first texture and a second texture) and two frame buffers (e.g., a first frame buffer and a second frame buffer). Depending on implementation, the textures can be used to store unprocessed image data or images (e.g., image data on which feature detection is to be performed). For example, unprocessed image data coming from a camera or a storage device may be received by the GPU (e.g., via a CPU) and stored into the first texture and/or the second texture. By way of example, unprocessed image data may be received by the GPU from a CPU and stored onto the second texture of the GPU.

In step 204, processing can be performed on a second image stored in a second memory unit (e.g., the second texture) of the plurality of memory units, to detect one or more features within the second image. Processing performed on image data in the second texture (e.g., the second image) may be used to detect any type of features in the second image. However, in certain aspects, the processing will be performed to detect corner features within the second image by the GPU to detect one or more corners occurring in the image data.

In practice, feature detection (e.g., corner detection) may be performed by the GPU using any algorithm effective for determining the existence of one or more features in the image data of the second image. For example, when performing corner detection, a Harris detection algorithm may be used. As discussed above, implementation of the Harris detection algorithm may include computing the corner strength (e.g., using Equation (1) and Equation (2), discussed above), with respect to groups of pixels in an image (e.g., the second image).

Once multiple corners within the image data have been detected, non-maximum suppression can be used to eliminate redundancies. Resulting corners can then be indicated in processed image data, as will be described in further detail below with respect to FIGS. 4A and 4B.

In step 206, one or more of the process portions of the second image can be written into a third memory unit of the plurality of memory units. In certain aspects, the third memory unit can comprise a frame buffer.

In step 208, image data stored in a fourth memory unit (e.g., image data of a third image) will be outputted. In certain aspects, the fourth memory unit can comprise a frame buffer. In practice, the frame buffers of the third memory unit and the fourth memory unit can be used to simultaneously output image data (e.g., from the fourth memory unit) and to receive processed image data (e.g., in the third memory unit). The GPU can process image data (e.g., of the second image) and store the processed image data to the third memory unit of GPU. Concurrently, processed image data in the fourth memory unit can be outputted (e.g., to a CPU); as such, the GPU need not wait to output the processed data in the fourth memory data before storing image data that is being processed.

Processed image data, indicating the locations of corner features in one or more images, can be used for a variety of purposes. For example, detected corner features in one or more images may be used to facilitate panorama image stitching, video or image stabilization and/or high-dynamic range (HDR) image creation.

Figure 3:
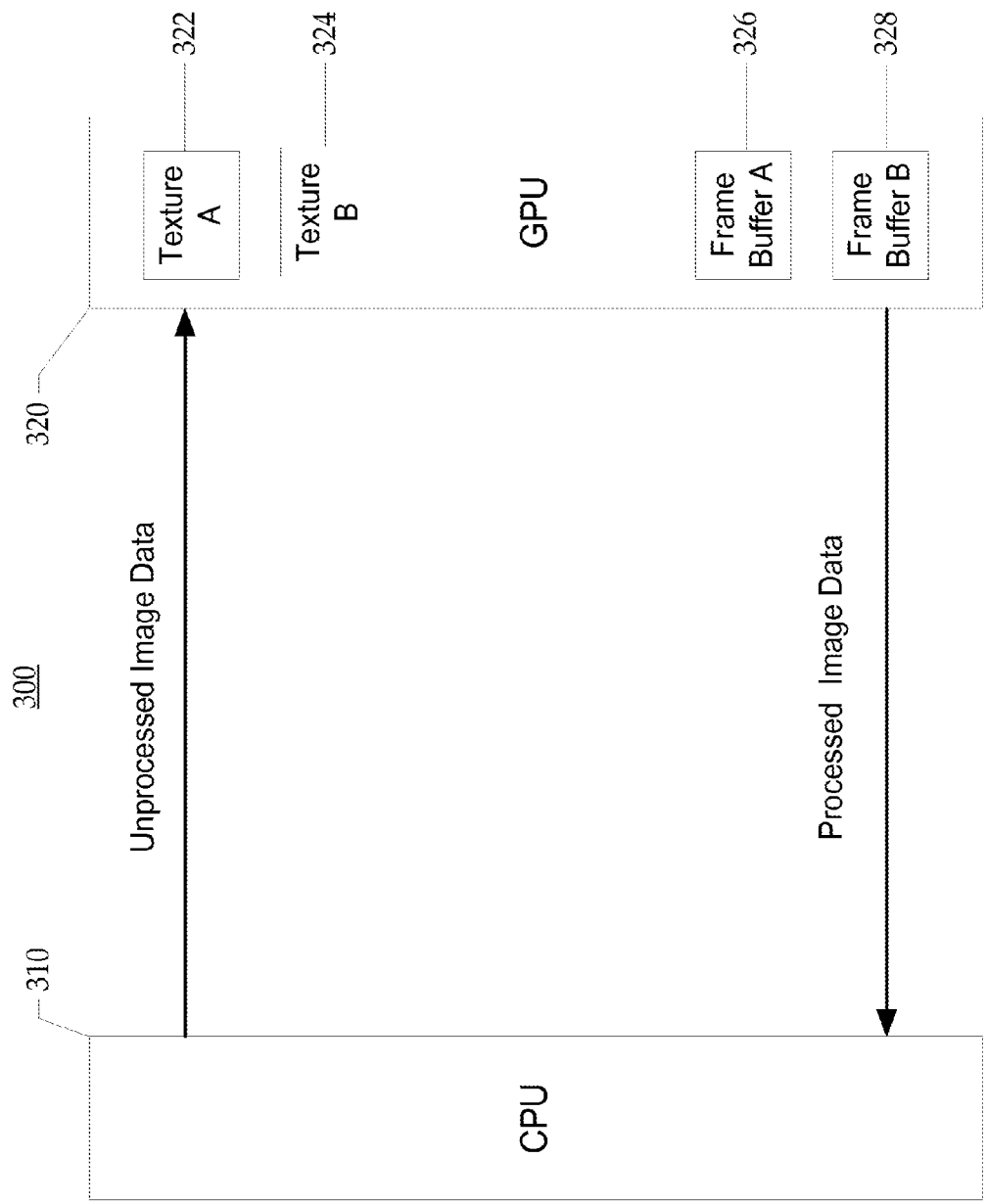
FIG. 3 illustrates a block diagram of an architecture that may be used for detecting image features, according to some aspects of the disclosure.

FIG. 3 illustrates a block diagram of an architecture that may be used for detecting image features. The architecture 300 comprises a CPU 310 and a GPU 320. Furthermore, the GPU 320 comprises Texture A 322 and Texture B 324, as well as, Frame Buffer A 326 and Frame Buffer B 328. Although the GPU 320 is depicted as having only two textures and two frame buffers, the GPU 320 may have a greater or fewer number of memory units, depending on implementation.

In practice, unprocessed image data is received by the GPU 320 (e.g., via the CPU 310) where it is stored in a texture (e.g., Texture B 324). Image processing can be performed on the unprocessed image data by GPU 320, for example, to detect one or more corner features located within the unprocessed image data. The resulting processed image data can then be stored in a frame buffer (e.g., Frame Buffer A 326). Because the GPU 320 has multiple memory portions available to incoming data (e.g., Texture A 322 and Texture B 324), the GPU need not wait to process all received data before receiving additional unprocessed image data.

For example, if a first image is received by the GPU 320 from the CPU 310, and stored in Texture B 324, the GPU could receive additional unprocessed image data (e.g., a second image), that could be stored in Texture A 322.

Similarly, as image processing proceeds, processed image data can be stored to one of multiple frame buffers (e.g., Frame Buffer A or Frame Buffer B) before being outputted from the GPU 320 (e.g., sent to the CPU 310). For example, Frame Buffer B 328 may contain processed image data of the first image. Thus, as the second image is being processed and the processed image data is being stored, for example, to Frame Buffer A 326, the processed image data of the first image can be outputted from Frame Buffer B 328, e.g., to the CPU 310. By configuring the GPU 320 to have multiple memory locations to store unprocessed image data received by the CPU 310 (as well as to store processed image data to be outputted from the GPU 320), image data can be received by, and output from the GPU 320, with less delay.

The CPU 310 and GPU 320 may reside on a mobile electronic device, such as a smart phone. In some implementations, image data (e.g., the first image) can be received by the CPU 310 (e.g., from a storage device or digital camera, etc.) and then sent to the GPU 320, for feature detection processing.

Figure 4A:
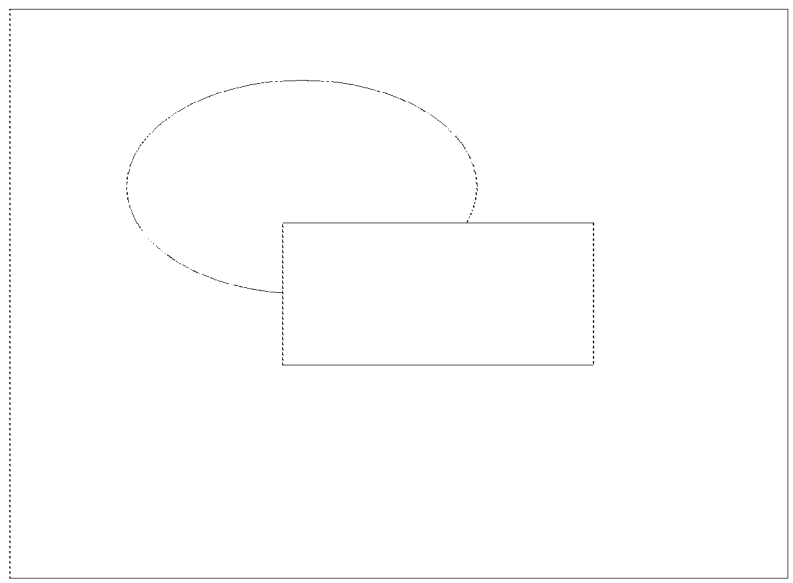
FIG. 4A conceptually illustrates an example of unprocessed image data, according to one aspect of the disclosure.

FIG. 4A conceptually illustrates an example of unprocessed image data. In practice, as feature detection processing is performed, one or more features within the image data are identified. In some implementations, the one or more features to be identified will correspond with corner features of in the unprocessed image data, for example, corners of one or more objects in an image comprising the unprocessed image data. As processing (e.g., corner detection processing) is performed, one or more corners in the image data can be identified and indicated in the processed image data.

Figure 4B:
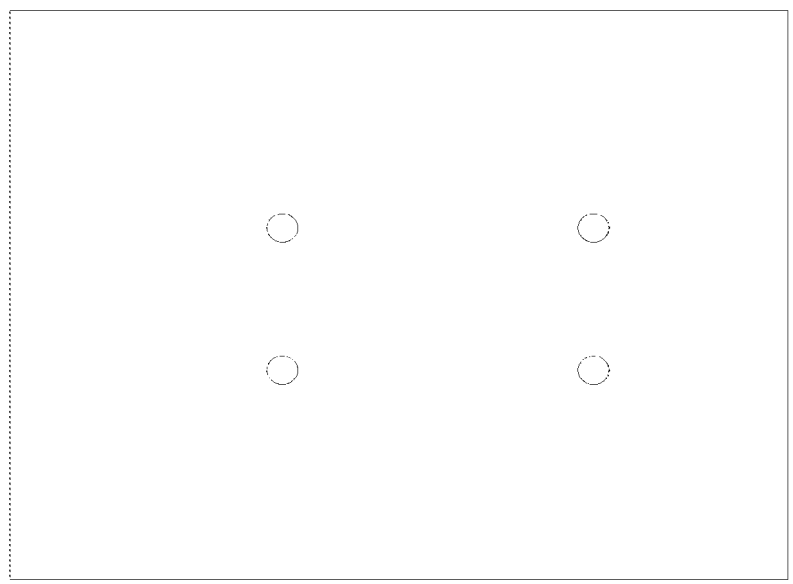
FIG. 4B conceptually illustrates an example of processed image data, resulting from the image of FIG. 4A, according to one aspect of the disclosure.

FIG. 4B conceptually illustrates an example of processed image data. As illustrated in FIG. 4B, the processed image data comprises an indication of the location of the corners features in FIG. 4A.

Figure 5:
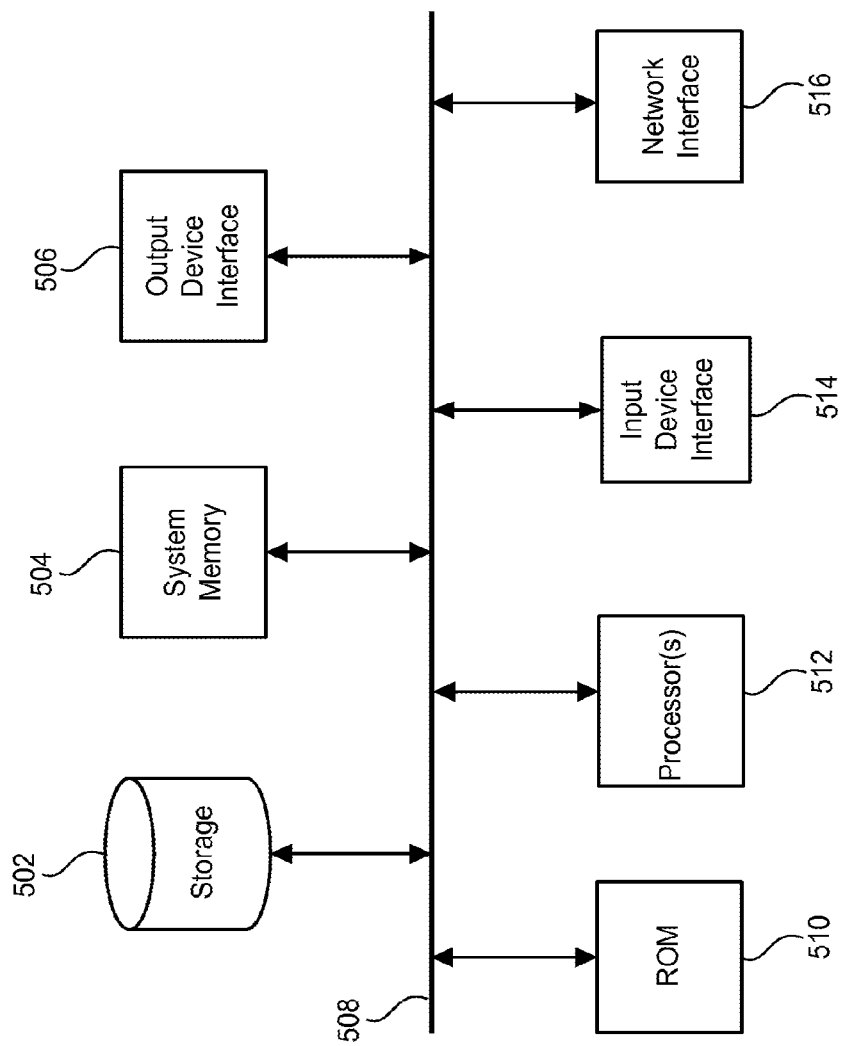
FIG. 5 illustrates an example of an electronic system with which some aspects of the subject technology can be implemented.

FIG. 5 illustrates an example of an electronic system 500 that can be used for executing the steps of the subject disclosure. In some examples, the electronic system 500 can be a mobile electronic device, such as a portable computer, a smart phone or a digital camera. Furthermore, in some implementations, the electronic system 500 can be operated alone or together with one or more other electronic systems e.g., as part of a cluster or a network of computers.

As illustrated, the electronic system 500 comprises storage 502, a system memory 504, an output device interface 506, system bus 508, ROM 510, one or more processor(s) 512, input device interface 514 and a network interface 516. In some aspects, the system bus 508 collectively represents all system, peripheral, and chipset buses that communicatively connect the numerous internal devices of the electronic system 500. For instance, system bus 508 communicatively connects the processor(s) 512 with the ROM 510, the system memory 504, the output device interface 506 and the permanent storage device 502.

From the various memory units, the processor(s) 512 can retrieve instructions to execute (and data to process) in order to execute the steps of the subject technology. The processor(s) 512 can be a single processor or a multi-core processor in different implementations. Additionally, the processor(s) can comprise one or more graphics processing units (GPUs) and/or one or more decoders, depending on implementation.

In certain aspects, the processor(s) 512 can include one or more CPUs and GPUs having on-chip memory portions. For example, one or more GPUs may contain on-chip memory divided into one or more logical portions. As discussed above, an on-chip memory of the GPU can comprise one or more "textures" (e.g., for use in receiving unprocessed image data from a CPU). Similarly, the on-chip memory can comprise one or more logically separate "frame buffers" (e.g., for use in sending processed image data back to the CPU).

The ROM 510 stores static data and instructions that are needed by the processor(s) 512 and other modules of the electronic system 500. Similarly, the processor(s) 512 can comprise one or more memory locations such as a CPU cache or processor in memory (PIM), etc. The storage device 502, is a read-and-write memory device. In some aspects, this device can be a non-volatile memory unit that stores instructions and data even when the processor-based system 500 is without power. Some implementations of the subject disclosure can use a mass-storage device (such as solid state, magnetic or optical storage devices) e.g., a permanent storage device 502.

Other implementations can use one or more a removable storage devices (e.g., magnetic or solid state drives) such as permanent storage device 502. Although the system memory can be either volatile or non-volatile, in some examples the system memory 504 is a volatile read-and-write memory, such as a random access memory. System memory 504 can store some of the instructions and data that the processor needs at runtime.

In some implementations, the processes of the subject disclosure are stored in system memory 504, permanent storage device 502, ROM 510 and/or one or more memory locations embedded with the processor(s) 512. From these various memory units, processor(s) 512 retrieve instructions to execute and data to process in order to execute the processes of some implementations of the instant disclosure.

The bus 508 also connects to the input device interface 514 and output device interface 506. The input device interface 514 enables a user to communicate information and select commands to the processor-based system 500. Input devices used with the input device interface 514 may include for example, alphanumeric keyboards and pointing devices (also called "cursor control devices") and/or wireless devices such as wireless keyboards, wireless pointing devices, etc.

Finally, as shown in FIG. 5, bus 508 also communicatively couples the processor-based system 500 to a network (not shown) through a network interface 516. It should be understood that the network interface 516 can be either wired, optical or wireless and may comprise one or more antennas and transceivers. In this manner, the processor-based system 500 can be a part of a network of computers, such as a local area network ("LAN"), a wide area network ("WAN"), or a network of networks, such as the Internet.

In practice the methods of the subject technology can be carried out by the processor-based system 500 using one or more CPUs and GPUs. In some aspects, instructions for performing one or more of the method steps of the present disclosure will be stored on one or more memory devices such as the storage 502 and/or the system memory 504.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

The invention claimed is:

1. A computer-implemented method for detecting features in images, the method comprising:
retrieving, by one or more processors, first image data from memory;
retrieving, by the one or more processors, second image data from the memory;
processing, by the one or more processors, the retrieved first image data to identify one or more features of a first image and to generate first processed image data based on the identified one or more features of the first image;
processing, by the one or more processors, the retrieved second image data to identify one or more features of a second image and to generate second processed image data based on the identified one or more features of the second image; and
storing the first and second processed image data in the memory.

2. The method of claim 1, wherein the first and second image data are retrieved from one or more texture regions of the memory, and the first and second processed image data are stored in one or more buffer regions of the memory.

3. The method of claim 1, wherein the one or more features of the first and second images include corner features.

4. The method of claim 3, further comprising performing panorama image stitching utilizing the corner features.

5. The method of claim 3, further comprising performing video or image stabilization utilizing the corner features.

6. The method of claim 3, further comprising performing high-dynamic range image creation utilizing the corner features.

7. The method of claim 1, wherein the one or more features of the first and second images include corner features, and the method further comprises eliminating duplicate corners in one or both of the first and the second images utilizing the corner features.

8. The method of claim 1, wherein storing the first and second processed image data in the memory includes storing the first processed image data in a first buffer and storing the second processed image data in a second buffer.

9. The method of claim 1, further comprising outputting a third image in accordance with at least one of the first and second processed image data.

10. A device for detecting features in images, the device comprising:
memory configured to store image data; and
one or more processors operatively coupled to the memory, the one or more processors being configured to:
retrieve first image data from the memory;
retrieve second image data from the memory;
process the retrieved first image data to identify one or more features of a first image and to generate first processed image data based on the identified one or more features of the first image;
process the retrieved second image data to identify one or more features of a second image and to generate second processed image data based on the identified one or more features of the second image; and
store the first and second processed image data in the memory.

11. The device of claim 10, wherein:
the memory includes one or more texture regions and one or more buffer regions;
the first and second image data are retrieved from the one or more texture regions of the memory; and
the first and second processed image data are stored in the one or more buffer regions of the memory.

12. The device of claim 10, wherein the one or more features of the first and second images include corner features.

13. The device of claim 12, wherein the one or more processors are further configured to perform at least one of:
panorama image stitching utilizing the corner features;
video or image stabilization utilizing the corner features; or
high-dynamic range image creation utilizing the corner features.

14. The device of claim 10, wherein the one or more features of the first and second images include corner features, and the one or more processors are further configured to eliminate duplicate corners in one or both of the first and the second images utilizing the corner features.

15. The device of claim 11, wherein storing the first and second processed image data in the memory includes storing the first processed image data in a first buffer of the one or more buffer regions and storing the second processed image data in a second buffer of the one or more buffer regions.

16. A system for processing features in images, the system comprising:
a first processor including memory configured to store image data; and
a second processor operatively coupled to the first processor;
wherein the first processor is configure to:
retrieve first image data from the memory;
retrieve second image data from the memory;
process the retrieved first image data to identify one or more features of a first image and to generate first processed image data based on the identified one or more features of the first image;
process the retrieved second image data to identify one or more features of a second image and to generate second processed image data based on the identified one or more features of the second image;
store the first and second processed image data in the memory; and
output a third image to the second processor in accordance with at least one of the first and second processed image data, and
wherein the second processor is configure to:
send the first and second image data to the memory of the first processor; and
receive the third image from the first processor.

17. The system of claim 16, wherein:
the memory includes one or more texture regions and one or more buffer regions;
the first and second image data are retrieved from the one or more texture regions of the memory; and
the first and second processed image data are stored in the one or more buffer regions of the memory.

18. The system of claim 16, wherein the first processor comprises one or more graphics processing units and the second processor comprises a central processing unit.

19. The system of claim 16, wherein the one or more features of the first and second images include corner features and one or both of the first and second processors are further configured to perform at least one of:
panorama image stitching utilizing the corner features;
video or image stabilization utilizing the corner features; or
high-dynamic range image creation utilizing the corner features.

20. The system of claim 16, wherein the one or more features of the first and second images include corner features, and one or both of the first and second processors are further configured to eliminate duplicate corners in one or both of the first and the second images utilizing the corner features.

* * * * *